US012558844B2

(12) United States Patent
Leonardo et al.

(10) Patent No.: US 12,558,844 B2
(45) Date of Patent: Feb. 24, 2026

(54) OPTICAL FIBERS INCLUDING ENDCAPS FOR USE IN ADDITIVE MANUFACTURING

(71) Applicant: VulcanForms Inc., Devens, MA (US)

(72) Inventors: Manuel Joseph Leonardo, Bolton, MA (US); Martin C. Feldmann, Sudbury, MA (US)

(73) Assignee: VulcanForms Inc., Devens, MA (US)

( * ) Notice: Subject to any disclaimer, the term of this patent is extended or adjusted under 35 U.S.C. 154(b) by 0 days.

(21) Appl. No.: 17/868,883

(22) Filed: Jul. 20, 2022

(65) Prior Publication Data

US 2023/0056367 A1     Feb. 23, 2023

Related U.S. Application Data

(60) Provisional application No. 63/234,816, filed on Aug. 19, 2021.

(51) Int. Cl.
| | |
|---|---|
| *B29C 64/268* | (2017.01) |
| *B29C 64/153* | (2017.01) |
| *B33Y 10/00* | (2015.01) |
| *B33Y 30/00* | (2015.01) |
| *G02B 6/26* | (2006.01) |
| *G02B 6/32* | (2006.01) |

(52) U.S. Cl.
CPC .......... *B29C 64/268* (2017.08); *B29C 64/153* (2017.08); *B33Y 10/00* (2014.12); *B33Y 30/00* (2014.12); *G02B 6/262* (2013.01); *G02B 6/32* (2013.01)

(58) Field of Classification Search
CPC ... B29C 64/268; B29C 64/153; B29C 64/277; B33Y 10/00; B33Y 30/00; G02B 6/262; G02B 6/32; G02B 6/3636; G02B 6/3676
See application file for complete search history.

(56) References Cited

U.S. PATENT DOCUMENTS

| | | | |
|---|---|---|---|
| 6,538,231 B2 | 3/2003 | Karube et al. | |
| 6,603,780 B2 | 8/2003 | Miyai | |
| 7,403,677 B1 * | 7/2008 | Zhao ........................ | G02B 6/32 |
| | | | 359/254 |

(Continued)

FOREIGN PATENT DOCUMENTS

| | | |
|---|---|---|
| CN | 109375380 A | 2/2019 |
| EP | 3 521 028 A1 | 8/2019 |

(Continued)

OTHER PUBLICATIONS

International Search Report and Written Opinion for International Application No. PCT/US2022/037661, mailed Oct. 19, 2022.

*Primary Examiner* — Susan D Leong
*Assistant Examiner* — Xinwen Ye
(74) *Attorney, Agent, or Firm* — Wolf, Greenfield & Sacks, P.C.

(57) ABSTRACT

Systems and methods for additive manufacturing are generally described. According to certain aspects, endcaps optically coupled to optical fibers of additive manufacturing systems are provided. In some aspects, methods for reducing a power area density of laser energy within an endcap are provided. The endcaps described herein may be used to at least partially mitigate thermal cycling that may result from the transmission of laser energy through interfaces of an additive manufacturing system.

31 Claims, 8 Drawing Sheets

(56) References Cited

U.S. PATENT DOCUMENTS

| | | | |
|---|---|---|---|
| 9,956,612 B1 | 5/2018 | Redding et al. | |
| 10,022,795 B1 | 7/2018 | Redding et al. | |
| 10,620,446 B1* | 4/2020 | Ho | G02B 27/1073 |
| 2010/0128243 A1* | 5/2010 | Liebman | G01S 7/4813 |
| | | | 356/3 |
| 2011/0228404 A1 | 9/2011 | Webb et al. | |
| 2013/0142481 A1* | 6/2013 | Rockwell | G02B 6/02009 |
| | | | 385/33 |
| 2014/0153087 A1 | 6/2014 | Hutchings et al. | |
| 2015/0241632 A1 | 8/2015 | Chann et al. | |
| 2016/0158889 A1 | 6/2016 | Carter et al. | |
| 2016/0228988 A1 | 8/2016 | Dallarosa et al. | |
| 2016/0368050 A1 | 12/2016 | Morris et al. | |
| 2017/0021455 A1 | 1/2017 | Dallarosa et al. | |
| 2017/0056975 A1 | 3/2017 | Carter et al. | |
| 2018/0049806 A1 | 2/2018 | Yu et al. | |
| 2018/0200792 A1 | 7/2018 | Redding et al. | |
| 2018/0207722 A1 | 7/2018 | Feldmann et al. | |
| 2018/0236549 A1 | 8/2018 | Spears et al. | |
| 2019/0039172 A1 | 2/2019 | Grapov | |
| 2019/0143406 A1 | 5/2019 | Carter et al. | |
| 2019/0299286 A1* | 10/2019 | Feldmann | B22F 12/45 |
| 2020/0039000 A1 | 2/2020 | Sweetland | |
| 2020/0108465 A1 | 4/2020 | Sweetland | |
| 2020/0230745 A1 | 7/2020 | Komsta et al. | |
| 2020/0284986 A1* | 9/2020 | Faulhaber | G02B 6/32 |
| 2020/0292756 A1* | 9/2020 | Langseth | G02B 6/2551 |
| 2020/0306880 A1 | 10/2020 | Vorontsov et al. | |
| 2020/0366048 A1 | 11/2020 | Vorontsov et al. | |
| 2020/0376600 A1 | 12/2020 | Aggarwal et al. | |
| 2020/0376761 A1 | 12/2020 | Sweetland | |
| 2021/0107062 A1 | 4/2021 | Feldmann et al. | |
| 2021/0229215 A1* | 7/2021 | Weston | B22F 12/44 |
| 2021/0339318 A1 | 11/2021 | Dunbar et al. | |
| 2022/0009030 A1 | 1/2022 | Dadelszen et al. | |
| 2023/0056367 A1 | 2/2023 | Leonardo et al. | |

FOREIGN PATENT DOCUMENTS

| | | | | |
|---|---|---|---|---|
| GB | 2338569 A | 12/1999 | | |
| WO | WO-2021069441 A1 * | 4/2021 | | B22F 12/45 |
| WO | WO 2025/006255 A2 | 1/2025 | | |

* cited by examiner

224

250

280

224

250

280

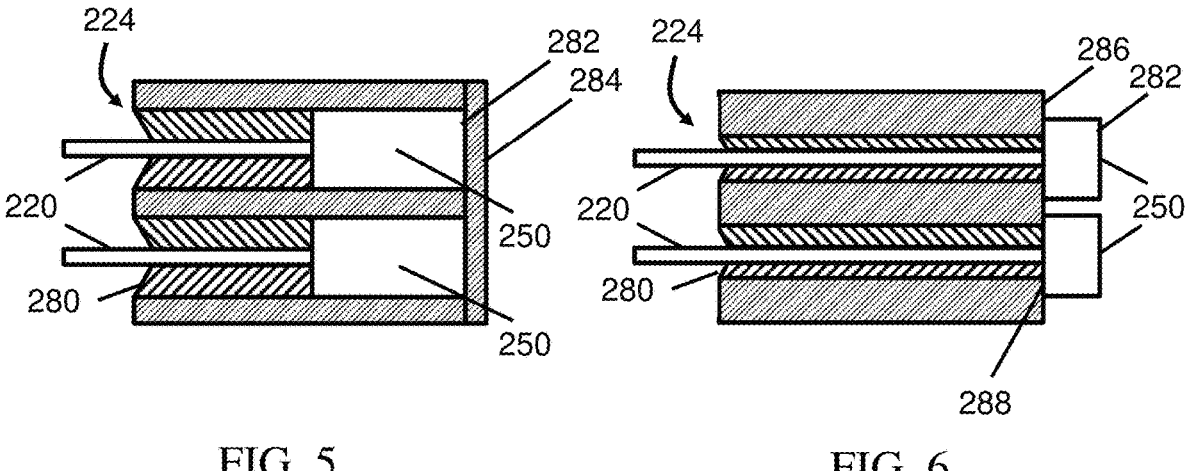
FIG. 5
FIG. 6
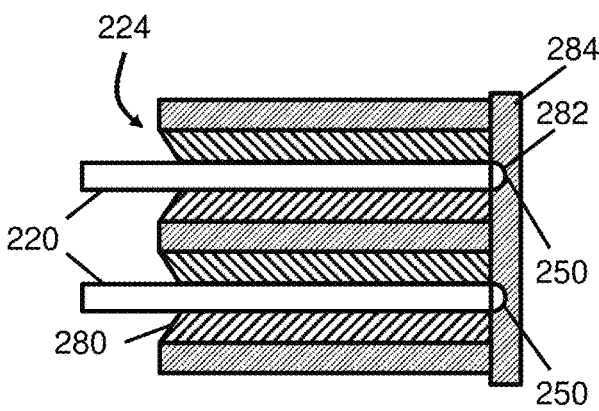
FIG. 7

OPTICAL FIBERS INCLUDING ENDCAPS FOR USE IN ADDITIVE MANUFACTURING

RELATED APPLICATIONS

This application claims priority under 35 U.S.C. § 119(e) to U.S. Provisional Application No. 63/234,816, filed Aug. 19, 2021, and entitled "OPTICAL FIBERS INCLUDING ENDCAPS FOR USE IN ADDITIVE MANUFACTUR-ING," which is incorporated herein by reference in its entirety for all purposes.

TECHNICAL FIELD

Systems and methods for using endcaps to manipulate laser energy in additive manufacturing systems are generally described.

BACKGROUND

The manufacturing speed and throughput of some additive manufacturing systems such as powder bed fusion systems is limited by the rate at which the powdered material can be fused. The rate of material fusion is dependent on multiple factors, including the total power delivered to the powdered material in the build volume of the system, as well as the energy per unit mass used to fuse the powdered material. In some instances, such as in systems utilizing one or more laser energy sources to deliver power to the build volume, the rate of fusion may be increased by including a plurality of laser energy sources. For example, by increasing the number of laser energy sources that can simultaneously fuse powder in a powder bed fusion process, the total power delivered to the build volume may be increased, and thus the rate of fusion can be increased.

SUMMARY

The subject matter of the present disclosure involves, in some cases, interrelated products, alternative solutions to a particular problem, and/or a plurality of different uses of one or more systems and/or articles.

In one aspect, an additive manufacturing system is provided. In some embodiments, the additive manufacturing system comprises: a laser energy source; an optics assembly configured to direct laser energy from the laser energy source onto a build surface to form a laser energy spot on the build surface; and an optical fiber optically coupled with the laser energy source; and an endcap disposed on and optically coupled with a distal end of the optical fiber, wherein a surface area of a distal surface of the endcap is larger than a transverse cross sectional area of the distal end of the optical fiber, and wherein the endcap is optically coupled with the optics assembly.

In another aspect, an additive manufacturing system is provided. In some embodiments, the additive manufacturing system comprises: a laser energy source; an optics assembly configured to direct laser energy from the laser energy source onto a build surface to form a laser energy spot on the build surface; an optical fiber optically coupled with the laser energy source; and an endcap disposed on and optically coupled with a distal end of the optical fiber, wherein the endcap is configured to increase a transmission area of laser energy transmitted from the laser energy source to reduce a power area density of the transmitted laser energy.

In yet another aspect, a method for additive manufacturing is provided. In some embodiments, the method for additive manufacturing comprises: transmitting laser energy from a laser energy source along an axial dimension of an optical fiber; reducing a power area density of the transmitted laser energy by increasing a transmission area of the transmitted laser energy within an endcap disposed on and optically coupled with the optical fiber, and directing laser energy output from the endcap onto a build surface to form a laser energy spot on the build surface.

In another aspect, a method for additive manufacturing is provided. In some embodiments, the method for additive manufacturing comprises: a plurality of laser energy sources; an optics assembly configured to direct laser energy from the plurality of laser energy sources onto a build surface to form an array of laser energy spots on the build surface; a plurality of optical fibers optically coupled with the plurality of laser energy sources; and one or more endcaps disposed on and optically coupled with a distal end of each optical fiber, wherein each endcap of the one or more endcaps has a surface area of a distal surface that is larger than a transverse cross-sectional area of the distal ends of the optical fibers disposed thereon, wherein the plurality of optical fibers forms an array.

Other advantages and novel features of the present disclosure will become apparent from the following detailed description of various non-limiting embodiments of the disclosure when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present disclosure will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the disclosure shown where illustration is not necessary to allow those of ordinary skill in the art to understand the disclosure. In the figures:

FIG. 5 presents an exemplary alignment fixture with optical fibers and corresponding endcaps positioned therein, according to certain embodiments;

FIG. 6 presents an exemplary alignment fixture with optical fibers and corresponding endcaps positioned therein, according to certain embodiments;

FIG. 7 presents an exemplary alignment fixture with optical fibers and corresponding endcaps positioned therein, according to certain embodiments;

DETAILED DESCRIPTION

Figure 1:
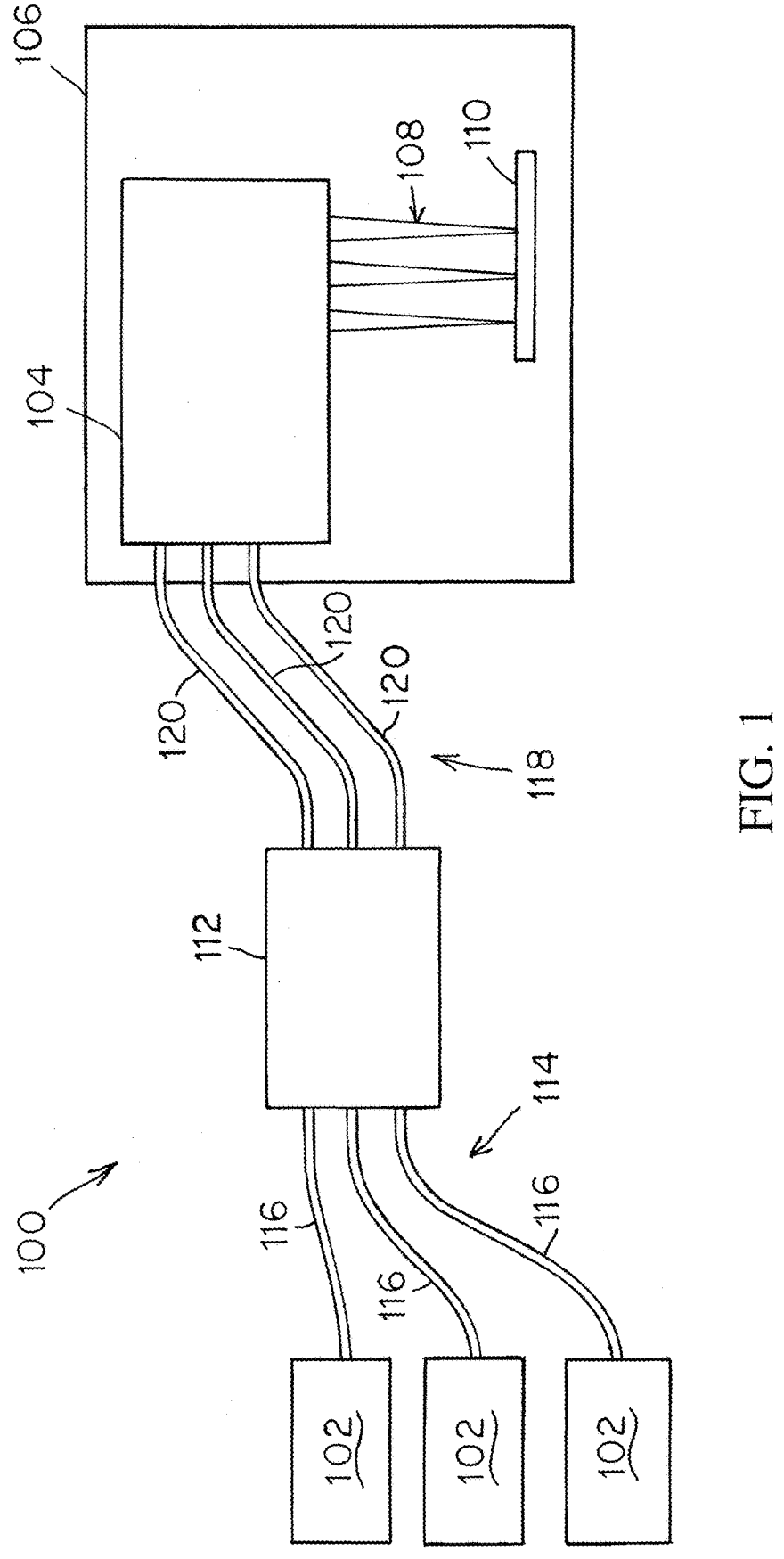
FIG. 1 presents an additive manufacturing system comprising laser energy sources, optical fibers, an optics assembly, and a build surface, according to certain embodiments.

The inventors have appreciated that additive manufacturing systems utilizing multiple optical fibers to deliver laser energy from one or more laser energy sources to powder in a build volume can present additional challenges. For example, it may be difficult to accurately align the exit surfaces of the optical fibers with respect to downstream optics (e.g., lenses, lens arrays, mirrors, etc.). The distal surfaces of the optical fibers also act as interfaces that may result in scattering, back reflection, and/or absorption of a portion of the laser energy transmitted through each of the optical fibers. Thus, when the laser energy sources are operated to deliver large powers to a build surface, these interfaces may result in undesirable heating of the ends of the optical fibers as well as undesirable back reflection of laser energy towards the associated laser energy source(s). This may result in damage to the laser source(s) as well as cyclic heating and cooling of the distal ends of the optical fibers as the lasers are repeatedly cycled between the on and off states during an additive manufacturing process. Additionally, at sufficiently high power settings, this heating of the distal ends of the optical fibers can even result in melting of the optical fibers.

The inventors have recognized that as the laser powers associated with an additive manufacturing process are increased the above-noted issues may become more pronounced. Accordingly, the inventors have recognized and appreciated numerous advantages associated with reducing a power area density of the energy being emitted from an interface located at a distal end of the one or more optical fibers connected to an additive manufacturing system. For example, in some embodiments, an additive manufacturing system may include one or more endcaps that are optically and physically coupled to the distal ends of one or more associated optical fibers used to provide laser energy to the additive manufacturing system. The endcaps may reduce a power area density of transmitted laser energy prior to transmission through a distal surface of the endcaps by providing an increased transmission area of the laser energy relative to a transverse cross-sectional area of the optical fibers without an endcap.

In some embodiments, an endcap disposed on and optically coupled to one or more associated optical fibers may have a distal surface with a surface area that may be larger than a transverse cross sectional area of the distal end of one or more optical fibers coupled to the endcap. According to certain embodiments, the increased surface area of the distal surface of the endcap relative to the surface area of the distal end of the optical fiber may provide the desired reduction in power area density of laser energy transmitted from the one or more endcaps.

Depending on the particular embodiment, the endcaps associated with the one or more optical fibers of a system may be comprised of any appropriate material that is optically transparent to the transmitted laser energy. Additionally, in some instances, the endcaps may be the same material as the associated optical fibers which may help to avoid scattering at an interface between the optical fibers and the connected endcaps. Appropriate materials for the optical fibers and/or endcaps may include, but are not limited to, fused silica, fused quartz, germanium doped silica, sapphire, rare earth doped fused silica, and/or any other appropriate material.

The endcaps of the various embodiments disclosed herein may be optically and physically connected to the associated optical fibers in any appropriate fashion. However, in some embodiments, it may be advantageous to fuse a distal end of the optical fibers to the associated endcaps. This may be accomplished by melting and bonding adjacent portions of the optical fibers and endcaps which may eliminate an interface between these components. By eliminating this interface, scattering and back reflection of the transmitted laser energy may be reduced. Appropriate methods for fusing the optical fibers and endcaps may include, but are not limited to, arc fusion, $CO_2$ laser, optical contact bonding, and/or any other appropriate fusing method. Of course, embodiments in which different types of connections between the optical fibers and endcaps are used are also contemplated including, for example, optical adhesives with matched indexes of refraction, hydroxide bonding, and/or any other appropriate type of connection.

As described in more detail below, the endcaps described in the various embodiments herein may have any appropriate size and/or shape to provide the desired functionality. For example, the endcaps may be configured such that the transmitted laser energy is transmitted through a curved distal surface, such as a microlens, a flat distal surface, or any other appropriately shaped distal surface. Curved distal surfaces configured to function as a lens may, according to certain embodiments, advantageously help to shape the transmitted laser energy and may help to decrease the portion of the laser energy that is reflected back to the laser energy source via the optical fiber. However, embodiments in which endcaps with shapes different from those noted above are also contemplated as the disclosure is not limited in this fashion.

Depending on the particular application, an additive manufacturing system may include any appropriate number of one or more endcaps and one or more corresponding optical fibers. For example, in some embodiments, each of the endcaps may be optically coupled with a distal end of a separate optical fiber of either one or a plurality of optical fibers (e.g., at least 2 optical fibers). According to another embodiment, each of the endcaps may be coupled with the distal ends of a separate group of optical fibers where each group includes a plurality of optical fibers. Of course, embodiments in which combinations of the above arrangements are used are also contemplated. Specific implementations of these constructions are elaborated on further below.

In some embodiments, an additive manufacturing system may include a laser energy source (e.g., a plurality of laser energy sources) and an optics assembly configured to direct laser energy from the laser energy source (e.g., the plurality of laser energy sources) onto a build surface. According to some embodiments, the one or more endcaps are optically coupled to the one or more laser energy sources and one or more associated optical fibers as noted above. Correspondingly, the one or more endcaps may be optically coupled with the optics assembly of the additive manufacturing system in any appropriate fashion. In such an embodiment, laser energy output from the endcap or endcaps may be directed onto a build surface through one or more intervening optical components of the optics assembly to form a laser energy spot on the build surface (e.g. lenses, optical fibers, galvo-scanners, lens arrays, etc.). Exposure of the laser energy to powdered material on the build surface may be used to fuse at least a portion of the powder to form a desired geometry on the build surface. In some instances, the optics assembly may be configured to form an array of laser energy spots on the build surface from the laser energy from each laser energy source. For example, the optics assembly may be configured to direct laser energy from each laser energy source to form one or more corresponding laser energy spots in the array. The array of laser spots may be a linear array, according to certain embodiments. However, the array of laser spots may be a two-dimensional array, according to certain embodiments. Additionally, additive manufacturing systems in which only a single laser energy spot is used are also contemplated as the disclosure is not limited in this fashion.

To facilitate the connection of lasers to an additive manufacturing system, one or more optical fiber connectors may be used. In such an embodiment, a system may further include an optical fiber connector coupled to either one, or a plurality of, laser energy sources (e.g., of the plurality of laser energy sources and the optics assembly). For example, a first optical fiber or first plurality of optical fibers may be optically coupled to the one or more corresponding laser energy sources and extend to and be connected with the optical fiber connector. Additionally, a second optical fiber or second plurality of optical fibers may extend from the optical fiber connector to the optics assembly to which the second plurality of optical fibers may be optically coupled. As elaborated on below, an optical fiber connector may be configured such that the one or more second optical fibers may be optically coupled to a corresponding optical fiber of the one or more first optical fibers within the optical fiber connector. In this manner, laser energy from the laser energy source or plurality of laser energy sources may be transmitted via the first optical fiber or first plurality of optical fibers to the optical fiber connector, and subsequently to the optics assembly via the second optical fiber or second plurality of optical fibers such that the laser energy can be delivered to the build surface. Depending on the particular embodiment, an optical fiber connector may be connected to either a stationary or movable optics assembly. In either case, the disclosed optical fibers and associated endcaps may be used at any interface between the laser sources and optics assembly where it may be desirable to reduce a power area density of the laser energy being transmitted through the system. This may include, for example one, or both, of the above noted connections between the separate optical fibers and the optical fibers with the optics assembly. Thus, it should be understood that the use of the disclosed optical fibers and associated endcaps are not limited to only the specific constructions and embodiments described herein.

In the various embodiments described herein, laser energy may be generated by one or more independently controllable laser energy sources and that are operated to deliver the laser energy to the optics assembly through one or more separate optical fibers associated with the laser energy sources. It should be understood that any appropriate type of optical fiber may be used including, for example, solid-core optical fibers. However, in other embodiments, the one or more optical fibers may include fiber segments spliced together to form a single optical fiber. Alternatively or additionally, a single optical fiber path may be generated by using an optical connector to couple the ends of two fibers together.

Regardless of the specific optical fiber construction, each optical fiber optically connected to the one or more laser energy sources of an additive manufacturing system may be appropriately routed to and optically connected with the optics assembly of the additive manufacturing system. In some embodiments, the distal ends of the one or more optical fibers may be disposed on and optically coupled to an endcap which is received in a mounting fixture (e.g., a fiber holder) that ensures the endcap of the optical fiber is properly aligned. For example, if the additive manufacturing system comprises a plurality of optical fibers, the distal end portions of the optical fibers may be oriented parallel to one another and the distal ends of the endcaps may be aligned with one another at a predetermined axial position within the mounting fixture, according to certain embodiments. This may facilitate coupling of the mounting fixture and the associated optical fibers with the optics assembly of the system. Specific constructions and features for aligning the endcaps of a system are described in greater detail with reference to the figures below.

As noted above, in some embodiments, an optical fiber extends between a laser energy source (and/or a plurality of laser energy sources) and an optics assembly of an additive manufacturing system. The optical fiber may be used, according to certain embodiments, to transmit laser energy from a laser energy source along an axial dimension of the optical fiber. The optical fiber may be directly connected to the laser energy source and/or the optics assembly. For example, according to some embodiments, the optical fiber is directly connected to both the optics assembly (e.g., at a distal end of the optical fiber) and to the laser energy source (e.g., at a proximal end of the optical fiber). In some embodiments, the optical fiber is only directly connected to either the optics assembly or the laser energy source. For example, according to certain embodiments, one end of the optical fiber is connected to an optical connector as described herein and a separate optical fiber is connected to the optics assembly. Further in some embodiments, an optical fiber is directly connected to neither the laser energy source nor the optics assembly. Regardless, the optical fibers and associated endcaps disclosed herein may be incorporated at any appropriate location between the laser energy sources and the optics assembly where it may be desirable to reduce a power area density of the laser energy being transmitted through the system.

The optical fiber may be a single optical fiber, or may be one of a plurality of optical fibers, according to certain embodiments. In some embodiments, the plurality of optical fibers according to certain embodiments may be aligned with corresponding predetermined positions and orientations. In particular, according to certain embodiments, the optical fibers may be axially aligned with one another in an optics assembly as described herein. For example, the optical fibers may be aligned axially such that the distal ends of the endcaps associated with the plurality of optical fibers are positioned within a predetermined range (i.e. a tolerance) of a desired axial position within the system. The optical fibers may also be aligned in one or more transverse directions relative to the axial direction of the optical fibers. For example, the optical fibers may be aligned with one another relative to a width and/or thickness direction of the optical fibers within an array arrangement of the optical fibers. The optical fibers and endcaps may be aligned in a linear array, in some embodiments. According to other embodiments, the optical fibers and endcaps may be aligned in a two-dimensional array. The alignment of the optical fibers may, according to certain embodiments, result in an advantageous arrangement of laser energy pixels, and in a preferred positioning of endcaps of the plurality of optical fibers with respect to downstream optics.

As noted above, it may be desirable to accurately locate and position the ends of the optical fibers and/or associated endcaps within a system. Accordingly, in some embodiments, the one or more optical fibers of a system may be coupled with an alignment fixture. For example, the alignment fixture may define a desired spatial distribution and/or orientation of the ends of the optical fibers and associated endcaps. In one such embodiment, the alignment fixture may orient each optical fiber to be oriented in parallel directions such that light traveling through the optical fibers may exit the alignment fixture along one or more paths that are parallel to a desired transmission direction. To improve this desired directionality, in some embodiments a distal surface of the one or more endcaps associated with one or more optical fibers retained in the alignment fixture may be optically polished after being positioned in the alignment fixture. The alignment fixture may also facilitate accurately positioning the one or more optical fibers at predetermined positions relative to a width and/or thickness of the alignment fixture where the width and thickness directions may be perpendicular to a length of the alignment fixture which is parallel to the longitudinal axes of the portions of the optical fibers positioned therein. In certain embodiments, an alignment fixture may include a plurality of alignment features such as v-grooves, holes, optical wedges, optical blocks, and/or any other appropriate alignment feature which the optical fibers and/or endcaps may be positioned in, bonded to, or otherwise appropriately positioned or engaged with such that the alignment fixture is configured to appropriately position the optical fibers and/or endcaps. Depending on the particular embodiment, the alignment features may be arranged in any suitable manner to define a desired spatial distribution of the ends of the optical fibers held in the alignment fixture.

In some embodiments, the incident laser spots on a build surface may be arranged in a line with a long dimension and a short dimension, or in an array. In either case, according to some aspects, a line, or array, of incident laser energy consists of multiple individual laser energy pixels arranged adjacent to each other that can have their respective power levels individually controlled. Each laser energy pixel may be turned on or turned off independently and the power of each pixel can be independently controlled. Due to the resulting pixel-based line or array being scanned primarily perpendicular to the long axis of the line in some embodiments, the forward velocities and pixel power densities may be bound by approximately the same power and velocity limits as traditional single spot laser selective melting processes. However, because there are multiple spots directly adjacent to each other, the effective process rate can be approximately N times the single pixel rate, where N is the number of available pixels. Also, because each pixel can be individually turned on or off, the effective part resolution and accuracy remains comparable to a single spot system. The system can be operated as a single spot system by only turning on a single pixel, or by relying on a single optical fiber extending between a single endcap and a single laser energy source, but then the effective system rate will be substantially the same as a single spot system.

Depending on the particular embodiment, an additive manufacturing system according to the current disclosure may include any suitable number of laser energy sources. For example, in some embodiments, the number of laser energy sources may be at least 5, at least 10, at least 50, at least 100, at least 500, at least 1,000, at least 1,500, or more. In some embodiments, the number of laser energy sources may be less than 2,000, less than 1,500, less than 1,000, less than 500, less than 100, less than 50, or less than 10. Additionally, combinations of the above-noted ranges may be suitable. Ranges both greater and less than those noted above are also contemplated as the disclosure is not so limited.

Additionally, in some embodiments, a power output of a laser energy source (e.g., a laser energy source of a plurality of laser energy sources) may be between about 50 W and about 2,000 W (2 kW). For example, the power output for each laser energy source may be between about 100 W and about 1.5 kW, and/or between about 500 W and about 1 kW. Moreover, a total power output of the plurality of laser energy sources may be between about 500 W (0.5 kW) and about 4,000 kW. For example, the total power output may be between about 1 kW and about 2,000 kW, and/or between about 100 kW and about 1,000 kW. Ranges both greater and less than those noted above are also contemplated as the disclosure is not so limited.

Depending on the embodiment, an array of laser energy pixels (e.g., a line array or a two dimensional array) may have a uniform power density along one or more axes of the array including, for example, along the length dimension (i.e. the longer dimension) of a line array. In other instances, an array can have a non-uniform power density along either of the axes of the array by setting different power output levels for each pixel's associated laser energy source. Moreover, individual pixels on the exterior portions of the array can be selectively turned off or on to produce an array with a shorter length and/or width. In some embodiments, the power levels of the various pixels in an array of laser energy may be independently controlled throughout an additive manufacturing process. For example, the various pixels may be selectively turned off, on, or operated at an intermediate power level to provide a desired power density within different portions of the array.

According to some aspects of the current disclosure, the optical path of the incident laser beams after exiting the optical fibers may be important to obtain a uniform line shape on a powder surface. In some embodiments, an optical path of an additive manufacturing system includes a lens array including one or more micro-lenses (e.g., one or more micro-lens arrays) followed by one or more objective lenses. In some embodiments, the beams from the independent laser energy sources may pass through the same lens array and the same objective lenses within an optics assembly.

Generally, laser energy produced by a laser energy source has a power area density. In some embodiments, the power area density of the laser energy transmitted through an optical fiber is greater than or equal to 0.1 W/micrometer$^2$, greater than or equal to 0.2 W/micrometer$^2$, greater than or equal to 0.5 W/micrometer$^2$, greater than or equal to 1 W/micrometer$^2$, greater than or equal to 1.5 W/micrometer$^2$, greater than or equal to 2 W/micrometer$^2$, or greater. In some embodiments, the power area density of the laser energy transmitted through the optical fiber is less than or equal to 3 W/micrometer$^2$, less than or equal to 2 W/micrometer$^2$, less than or equal to 1.5 W/micrometer$^2$, less than or equal to 1 W/micrometer$^2$, less than or equal to 0.5 W/micrometer$^2$, less than or equal to 0.2 W/micrometer$^2$, or less. Combinations of these ranges are possible. For example, in some embodiments, the power area density of the laser energy transmitted through the optical fiber is greater than or equal to 0.1 W/micrometer$^2$ and less than or equal to 3 W/micrometer$^2$.

The power area density of the laser energy transferred from the distal end of an optical fiber into an associated endcap may be reduced, in some embodiments, by increasing a transmission area of the transmitted laser energy within an endcap. For example, according to certain embodiments, the power area density is reduced by a factor of at least 1.1, at least 1.2, at least 1.5, at least 2, at least 2.5, at least 3, at least 4, at least 5, at least 10, or at least 15, or more within the endcap relative to the power area density within the associated optical fiber. The reduction in power area density may also be less than or equal to a factor of 50, 20, 15, 10, or 5 times less than the power area density within the associated optical fiber. In view of the above, in certain embodiments, the transmission area of the transmitted laser energy, such as a distal surface area of the endcap oriented towards one or more downstream optics, may correspondingly be increased by a factor of at least 1.1, at least 1.2, at least 1.5, at least 2, at least 2.5, at least 3, at least 4, at least 5, at least 10, or at least 15, or more within the endcap relative to a transverse cross sectional area of the associated optical fiber (e.g. a transverse cross-sectional area of a core of the optical fiber). The transmission area of the transmitted laser energy within the endcap may also be less than or equal to 50, 20, 15, 10, or 5 times greater than the transmission area (e.g. transverse cross sectional area) of the associated optical fiber. Combinations of the foregoing ranges are contemplated including, for example, a reduction in power area density within an endcap optically coupled to an optical fiber may be between or equal to 1.1 and 50 times less than or equal to the power area density within the optical fiber. Correspondingly, the transmission area within the endcap may be between or equal to 1.1 and 50 times greater than or equal to the transmission area of the associated optical fiber. Of course, ranges both greater than and less than those noted above are also contemplated as the disclosure is not so limited.

Depending on the embodiment, an additive manufacturing system may include an optical path arranged within an optics assembly (e.g., an optics box) to generate the line or array of pixels on a build surface using any appropriate arrangement and/or combination of different optics which may also be referred to as optical components or optical elements herein. For example, a set of lenses and/or lens arrays may be arranged in series downstream along the optical path relative to the associated one or more optical fibers and endcaps. Alternatively or additionally, a mirror or multiple mirrors can be added to the beam path downstream from the one or more optical fibers and endcaps for beam turning or folding, and/or a galvo-scanner can be added to the beam path for one-axis powder bed scanning. As described in more detail below, in some embodiments, output from the optics assembly can be directed towards the powder layer using a galvo-scanner that is then passed through a lens or lens assembly to minimize beam shape distortion for non-perpendicular incidence on the powder layer such as an f-theta or telecentric lens.

Depending on the application, output of the optics assembly may be scanned in a primary direction using a galvo-scanner while the entire optics assembly is scanned in a secondary direction perpendicular to the primary direction using a motorized stage actuator. Alternately the output of the optics assembly may be scanned in a fast motion using a galvo-scanner in a primary direction while the optics box is scanned in a slower motion in both the primary direction and a secondary direction perpendicular to the primary direction using orthogonally mounted motorized stages. In other embodiments, the output from the optic assembly may be scanned using only motorized stage movement without any galvo-scanner stage. In further embodiments, the optics assembly may be mounted such that the pixel array output from the optics assembly is oriented at a fixed angle relative to the motion stages such that both stages may be actuated to move the line perpendicular to the long axis of the pixel line. Alternately this may be achieved with the output from the optics assembly being scanned using a galvo-scanner. In other embodiments, the output from the optics assembly may be dynamically rotated with respect to the motion stages during motion. Alternately the dynamic rotation of the optics box can be coupled with a galvo-scanner that is fixed relative to the optics box. Accordingly, in view of the above embodiments, it should be understood that the laser pixels may be moved relative to a build surface using any appropriate construction as the disclosure is not limited in this fashion.

In some instances, it may be desirable to reduce the reflection of light from a distal interface, i.e. surface, of the one or more endcaps included in a system. Accordingly, in some embodiments, the endcaps of a system may be at least partially (e.g., completely) coated with an anti-reflective coating or other desired coating. The antireflective coating may, in some embodiments, reduce the reflection of laser energy from a surface of the endcap. The antireflective coating may be applied using sputtering, ion beam sputtering, ion beam magnetron sputtering, evaporative methods, and/or any other suitable method to apply a coating to a transparent base material. This may advantageously increase the power area density of the transmitted laser energy, while reducing undesirable reflection of laser energy towards the laser energy source.

For the sake of clarity, transmission of laser energy through an optical fiber is described generically throughout. However, with respect to various parameters such as transverse cross-sectional area, transverse dimension, transmission area, power area density, and/or any other appropriate parameters related to a portion of an optical fiber that the laser energy is transmitted through, it should be understood that these parameters refer to either a parameter related to a bare optical fiber and/or a portion of an optical fiber that the laser energy is actively transmitted through such as an optical fiber core, or a secondary optical laser energy transmitting cladding surrounding the core. In contrast, any surrounding cladding, coatings, or other materials that do not actively transmit the laser energy may not be included in the disclosed ranges.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of an additive manufacturing system 100, including a plurality of laser energy sources 102 that deliver laser energy to an optics assembly 104 positioned within a machine enclosure 106. For example, the machine enclosure may define a build volume in which an additive manufacturing process may be carried out. In particular, the optics assembly may direct laser energy 108 towards a build surface 110 positioned within the machine enclosure to selectively fuse powdered material on the build surface. As described in more detail below, the optics assembly may include a plurality of optics defining an optical path within the optics assembly that may transform, shape, and/or direct laser energy within the optics assembly such that the laser energy is directed onto the build surface as an array of laser energy pixels. The optics assembly may be movable within machine enclosure 106 to scan laser energy 108 across build surface 110 during a manufacturing process, though embodiments in which the optics assembly is stationary relative to the build surface are also contemplated.

Additive manufacturing system 100 further includes an optical fiber connector 112 positioned between the laser energy sources 102 and the optics assembly 104. As illustrated, a first plurality of optical fibers 114 extends between the plurality of laser energy sources 102 and the optical fiber connector 112. In particular, each laser energy source 102 is coupled to the optical fiber connector 112 via a respective optical fiber 116 of the first plurality of optical fibers 114. Similarly, second plurality of optical fibers 118 extends between the optical fiber connector 112 and the optics assembly 104. Each optical fiber 116 of the first plurality of optical fibers 114 is coupled to a corresponding optical fiber 120 of the second plurality of optical fibers 118 within the optical fiber connector. In this manner, laser energy from each of the laser energy sources 102 is delivered to the optics assembly 104 such that laser energy 108 can be directed onto the build surface 110 during an additive manufacturing process (i.e., a build process).

In some instances, the laser energy sources 102 and optical fiber connector 112 may be stationary relative to a machine enclosure 106. In this manner, the optical fibers 116 of the first plurality of optical fibers 114 may remain substantially stationary throughout a build process, which may aid in avoiding applying stresses to the optical fibers and/or connections or couplings of the optical fibers, which can lead to failure of the optical fibers. Depending on the embodiment, the optical fibers 120 of the second plurality of optical fibers 118 may be movable relative to the stationary optical fiber connector 112 by virtue of their coupling to a movable optics assembly 104. While such movement may impart stresses onto the optical fibers and/or connections or couplings of the optical fibers, aspects described herein may facilitate rapid and simple replacement of the optical fibers 120.

Figure 2:
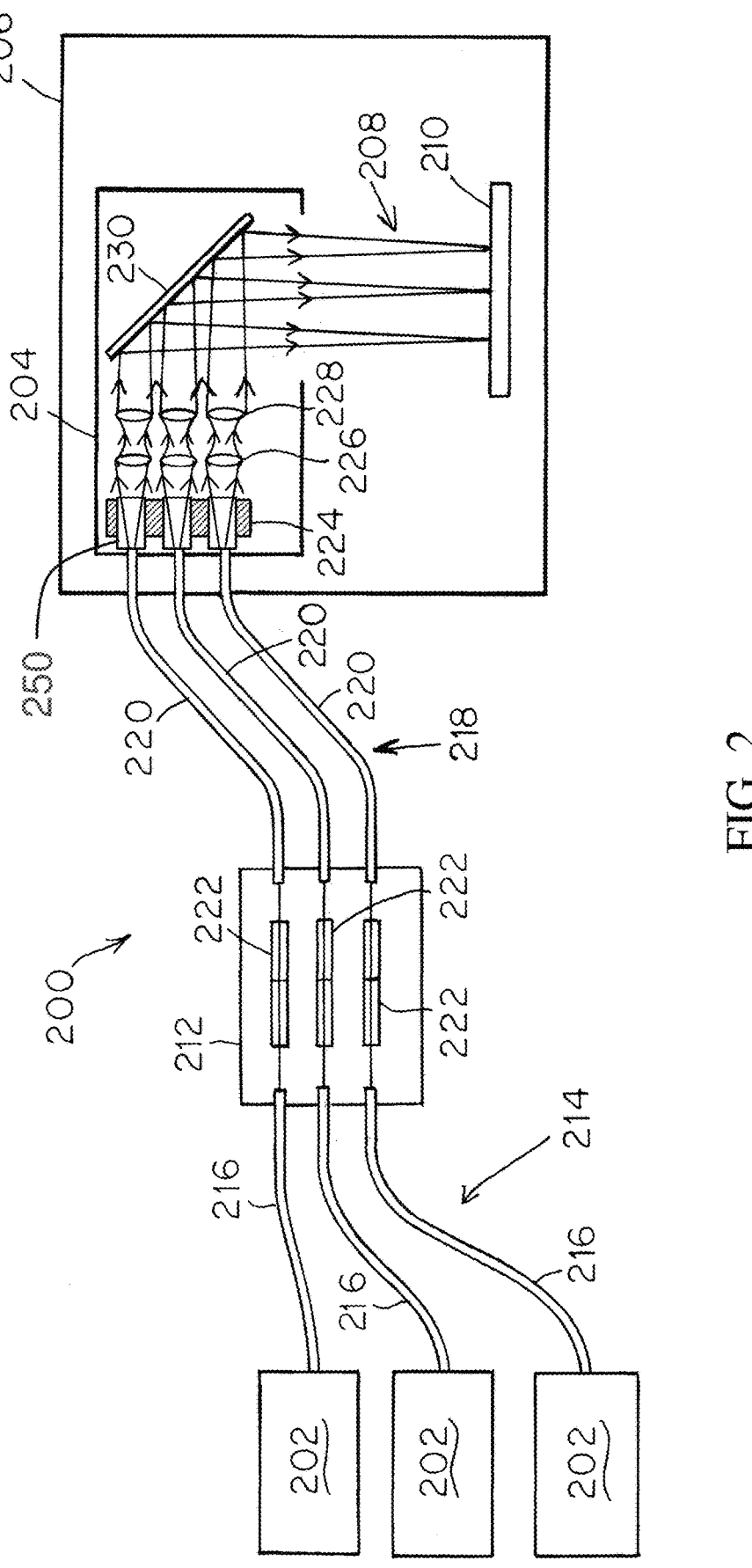
FIG. 2 presents an additive manufacturing system comprising laser energy sources, optical fibers, endcaps, an optics assembly, and a build surface, according to certain embodiments.

FIG. 2 is a schematic representation of another embodiment of an additive manufacturing system. Similar to the embodiment discussed above in connection with FIG. 1, the additive manufacturing system 200 includes a plurality of laser energy sources 202 coupled to the optics assembly 204 within the machine enclosure 206 via the optical fiber connector 212. The first plurality of optical fibers 214 extends between the laser energy sources 202 and the optical fiber connector 212, and the second plurality of optical fibers 218 extends between the optical fiber connector 212 and optics assembly 204. In particular, each optical fiber 216 of the first plurality of optical fibers is coupled to a laser energy source 202 and corresponding optical fiber 220 of the second plurality of optical fibers 218. In the depicted embodiment, optical fibers 216 are coupled to corresponding optical fibers 220 via fusion splices 222 within the optical fiber connector 212. However, embodiments, in which the optical fibers positioned within the connector include endcaps as described herein are also envisioned.

In the depicted embodiment, the optical fibers 220 of the second plurality of optical fibers 218 are optically coupled to one or more corresponding endcaps 250 disposed on the distal ends of the second plurality of optical fibers. The endcaps 250 are optically coupled to an optics assembly 204 of the system. For example, an alignment fixture 224 configured to define a desired spatial distribution of the optical fibers and endcaps may be used to direct laser energy into the optics assembly. For example, the alignment fixture may comprise a block having a plurality of v-grooves or holes in which each endcap 250 may be positioned and coupled to in order to accurately position the optical fibers and endcaps within the system. Further embodiments and examples of endcaps and alignment fixtures are discussed further below.

The alignment fixture may be used to align each of the optical fibers 220 of the second plurality of optical fibers 218 with one or more corresponding optical components of the optics assembly 204. Consequently, separate alignment operations for each optical fiber 220 (corresponding to each laser energy source 202) may not be required, which may facilitate rapid replacement of the second plurality of optical fibers 218 if needed or otherwise desired (e.g., if one or more optical fibers 220 fails).

Additionally, FIG. 2 depicts exemplary optics that are optically coupled downstream from the second plurality of optical fibers 218 and the associated endcaps 250. The various optics may be included in the optics assembly to direct laser energy from the second plurality of optical fibers 218 onto the build surface 210, and to form a desired array of laser energy 208 on the build surface. For example, the optics assembly may include beam forming optics such as lenses 226 and 228 (which may be individual lenses, lens arrays, and/or combined macrolenses), mirrors 230, and/or any other appropriate type of optics disposed along the various optical paths between the endcaps and the build surface which may shape and direct the laser energy within the optics assembly. In some embodiments, lenses 226 and 228 may include one or more of micro-lens arrays, and objective lenses. For example, micro-lens arrays may be arranged to collimate the laser energy output from each optical fiber 220 and transform the beam shape of the laser energy, and objective lenses may be arranged to define a focal length for the combined array of laser energy and serve to demagnify or magnify the output from the micro-lens array. In some instances, this demagnification or magnification may be used to adjust the spacing of laser energy pixels in the array of laser energy formed on the build surface. For example, the objective lenses may be arranged to demagnify the array such that there is no spacing between adjacent pixels. Moreover, it should be understood that the current disclosure is not limited to any particular shape, spacing, and/or arrangement of laser energy pixels in the array of laser energy 208 formed on the build surface. For example, the array may be a rectangular array with regularly spaced pixels of laser energy, or the array may be an irregular shape with non-uniform spacing between pixels.

The optical fibers discussed herein have a transverse dimension and an axial dimension, according to certain embodiments. Generally, the axial dimension of the optical fiber extends along the length of the optical fiber. Generally, a transverse dimension of the optical fiber lies within a transverse cross-section of the fiber perpendicular to the axial dimension. The axial dimension of the optical fiber may be substantially (e.g., 100 times, 1000 times, 10,000 times, 100,000 times, or more than 100,000 times) longer than a maximum transverse dimension (e.g. a diameter) of the optical fiber, according to certain embodiments. In some embodiments, laser energy is transmitted through the optical fiber along an axial dimension of the optical fiber. For example, in FIG. 2, laser energy transmitted from the laser energy sources 202 is transmitted through optical fibers 216 along the axial dimensions of the fibers 216. In some instances, an angle between a direction of transmission of laser energy within an optical fiber and an axial dimension is less than or equal to 3 degrees, less than or equal to 2 degrees, less than or equal to 1.5 degrees, less than or equal to 1 degree, less than or equal to 0.5 degrees, less than or equal to 0.2 degrees, or less.

In some instances, an optical fiber has a maximum transverse dimension (e.g., diameter) that is perpendicular to an axial direction of the optical fiber. For example, according to certain embodiments, the maximum transverse dimension of the optical fiber is greater than or equal to 30 microns, 50 microns, 75 microns, 100 microns, 125 microns, 150 microns, or more. According to certain embodiments, the maximum transverse dimension of the optical fiber is less than or equal to 200 microns, less than or equal to 175 microns, less than or equal to 150 microns, less than or equal to 125 microns, less than or equal to 100 microns, less than or equal to 75 microns, less than or equal to 50 microns, or less. Combinations of these ranges are possible. For example, according to certain embodiments, the maximum transverse dimension of the optical fiber is greater than or equal to 30 microns and less than or equal to 200 microns. Of course, optical fibers with maximum transverse dimensions that are greater than or less than the ranges noted above are also contemplated as the disclosure is not so limited.

According to certain embodiments, the fiber comprises a core, through which laser energy is transmitted. In some instances, a maximum transverse dimension of the core of the optical fiber (e.g., the maximum core diameter of the optical fiber) is greater than or equal to 5 microns, 10 microns, 20 microns, 25 microns, 35 microns, 40 microns, or more. According to certain embodiments, the maximum transverse dimension of the core of the optical fiber is less than or equal to 60 microns, 55 microns, 50 microns, 45 microns, 40 microns, 35 microns, or less. Combinations of these ranges are possible. For example, according to certain embodiments, the maximum transverse dimension of the optical fiber is greater than or equal to 5 microns and less than or equal to 60 microns. Of course, optical fibers with cores having maximum transverse dimensions both greater than and less than those noted above are also contemplated as the disclosure is not limited in this fashion.

The transverse dimensions of the core can present challenges in coupling light (e.g., laser energy) into and out of the optical fibers since most of the light being coupled into the optical fiber needs to be focused onto a spot smaller than the transverse dimension (e.g., core diameter) of the fiber, and the light may need to be focused into the optical fiber with a divergence angle less than that of the optical fiber. This may necessitate precise alignments of optical fibers within an additive manufacturing system, since light that is not properly focused into a core of the optical fiber can escape into a cladding of the optical fiber surrounding the core, which can lead to undesirable losses in the power transmission efficiency and/or heating of the optical fiber.

According to certain embodiments, a divergence angle of light exiting the cores of the optical fibers may be between about 0.3 degrees and about 1.5 degrees. In some embodiments, the divergence angle of light exiting the cores is greater than or equal to 0.2 degrees, greater than or equal to 0.25 degrees, greater than or equal to 0.3 degrees, greater than or equal to 0.35 degrees, greater than or equal to 0.4 degrees, greater than or equal to 0.5 degrees, or greater. In some embodiments, the divergence angle of light exiting the cores is less than or equal to 2 degrees, less than or equal to 1.8 degrees, less than or equal to 1.5 degrees, less than or equal to 1.3 degrees, less than or equal to 1.1 degrees, or less. Combinations of these ranges are possible. For example, in some embodiments, divergence angle of light exiting the cores is greater than or equal to 0.2 degrees and less than or equal to 2 degrees. Of course, optical fibers with divergence angles both greater than and less than those noted above are also contemplated as the disclosure is not limited in this fashion.

FIGS. 3A-3E present perspective illustrations of exemplary endcaps with different shapes that may coupled to optical fibers for use in an additive manufacturing system, according to certain embodiments. However, it should be understood that endcaps with any appropriate size and/or shape to provide the desired reduced power area density for laser energy transmission may be used as the disclosure is not limited in this fashion.

Figure 3A:
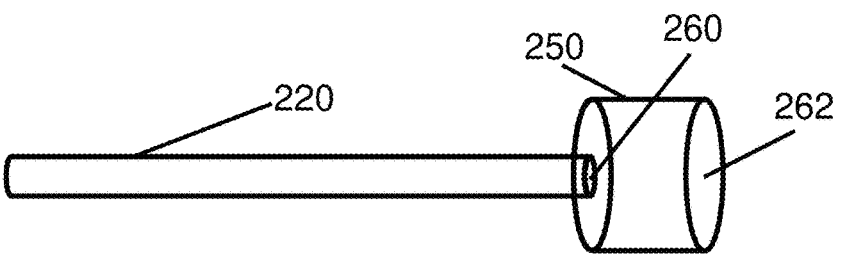
FIG. 3A presents an exemplary cylindrical endcap that is optically coupled to an optical fiber, according to certain embodiments.

In FIG. 3A, an endcap 250 is a cylindrical endcap, which is disposed upon and optically coupled to a distal end 260 of an optical fiber 220. For example, optical fiber 220 may be fused to endcap 250 at distal end 260. In the example of FIG. 3A, endcap 250 is a cylindrical endcap. According to certain embodiments, cylindrical endcaps may aid with the alignment of the associated optical fibers. For example, in some embodiments, cylindrical endcaps may be more easily aligned using an alignment fixture as detailed further below.

In FIG. 3A, the endcap 250 further comprises a distal surface 262, in some embodiments. A surface area of a distal surface of the endcap may be larger than a transverse cross sectional area of the optical fiber. For example, as presented in FIG. 3A, distal surface 262 of endcap 250 has a surface area that is larger than a cross-sectional area of the distal end 260 of the optical fiber 220. As noted above, this may provide an increased transmission area of the laser energy within the endcap that is transmitted from the laser energy source. For example, laser energy transmitted from the laser energy source through optical fiber 220 and into endcap 250 may diverge within endcap 250, resulting in an increase in the transmission area of the laser energy transmission.

In the various embodiments described herein, an optical fiber may have a transverse cross sectional area of greater than or equal to 25 microns$^2$, greater than or equal to 50 microns$^2$, greater than or equal to 100 microns$^2$, greater than or equal to 200 microns$^2$, greater than or equal to 500 microns$^2$, greater than or equal to 1,000 microns$^2$, greater than or equal to 2,000 microns$^2$, greater than or equal to 5,000 microns$^2$, greater than or equal to 10,000 microns$^2$, or greater. In some embodiments, the transverse cross-sectional area may be less than or equal to 25,000 microns$^2$, less than or equal to 10,000 microns$^2$, less than or equal to 5,000 microns$^2$, less than or equal to 2,000 microns$^2$, less than or equal to 1,000 microns$^2$, less than or equal to 500 microns$^2$, less than or equal to 200 microns$^2$, less than or equal to 100 microns$^2$, less than or equal to 50 microns$^2$, or less. Combinations of these ranges are possible. For example, in some embodiments, the transverse cross-sectional area of the optical fiber may be greater than or equal 25 microns$^2$ and less than or equal to 25,000 microns$^2$. Of course areas both less than and greater than those noted above are also contemplated as the disclosure is not limited in this fashion.

In the various embodiments described herein, a distal surface of an endcap oriented towards downstream optics that are optically coupled to the endcap may have a surface area of greater than or equal to 0.01 mm$^2$, greater than or equal to 0.05 mm$^2$, greater than or equal to 0.1 mm$^2$, greater than or equal to 0.5 mm$^2$, greater than or equal to 1 mm$^2$, greater than or equal to 2 mm$^2$, greater than or equal to 5 mm$^2$, or greater. In some embodiments, the distal surface of the endcap has a surface area of less than or equal to 20 mm$^2$, less than or equal to 15 mm$^2$, less than or equal to 10 mm$^2$, less than or equal to 5 mm$^2$, less than or equal to 1 mm$^2$, less than or equal to 0.5 mm$^2$, less than or equal to 0.1 mm$^2$, or less. Combinations of these ranges are possible. For example, in some embodiments, the distal surface of the endcap has a surface area of greater than or equal to 0.01 mm$^2$ and less than or equal to 20 mm$^2$. Of course areas both less than and greater than those noted above are also contemplated as the disclosure is not limited in this fashion.

The endcaps disclosed herein may have a maximum transverse dimension (e.g., a diameter, or width measured parallel to a transverse dimension of the distal end of an optical fiber disposed on the endcap), according to certain embodiments. In some embodiments, the maximum transverse dimension of the endcap is greater than or equal to 125 microns, greater than or equal to 250 microns, greater than or equal to 500 microns, greater than or equal to 750 microns, greater than or equal to 1 mm, greater than or equal to 1.5 mm, or greater. In some embodiments, the maximum transverse dimension of the endcap is less than or equal to 2 mm, less than or equal to 1.5 mm, less than or equal to 1 mm, less than or equal to 750 microns, less than or equal to 500 microns, less than or equal to 250 microns, or less. Combinations of these ranges are possible. For example, in some embodiments, the maximum transverse dimension of the endcap is greater than or equal to 125 microns and less than or equal to 2 mm. However, maximum transverse dimensions both greater than and less than those noted above are also contemplated.

The various disclosed endcaps may also have any appropriate length (e.g., length extending axially from the distal end of the optical fiber disposed on the endcap). In some embodiments, an endcap has a length of greater than or equal to 100 microns, greater than or equal to 200 microns, greater than or equal to 500 microns, greater than or equal to 1 mm, greater than or equal to 2 mm, greater than or equal to 3 mm, or greater. In some embodiments, the endcap has a length of less than or equal to 5 mm, less than or equal to 4 mm, less than or equal to 3 mm, less than or equal to 2 mm, less than or equal to 1 mm, less than or equal to 500 microns, or less. Combinations of these ranges are possible. For example, in some embodiments, an endcap may have a length of greater than or equal to 100 microns and less than or equal to 5 mm. Of course, lengths both greater than and less than those noted above are also contemplated.

Figure 3B:
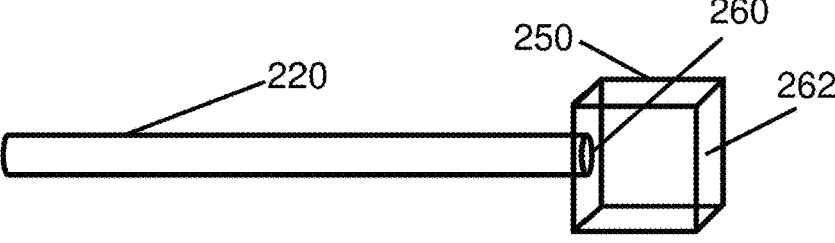
FIG. 3B presents an exemplary prism endcap that is optically coupled to an optical fiber, according to certain embodiments.

FIG. 3B depicts another embodiment of an optical fiber with an endcap that is similar to FIG. 3A, except that in this embodiment, the endcap 250 disposed on and optically coupled to the distal end of the optical fiber 220 is a prism. Any appropriate prism may be used. For example, the prism of FIG. 3B is a rectangular prism. However, any appropriately sized and shaped prism may be used as the disclosure is not limited in this fashion. In some embodiments, the use of prisms as endcaps is advantageous. For example, in some embodiments, prisms can be tessellated, which can facilitate the alignment of endcaps into arrays. According to certain embodiments, each endcap of the one or more endcaps optically coupled to a plurality of optical fibers is a prism.

Figure 3C:
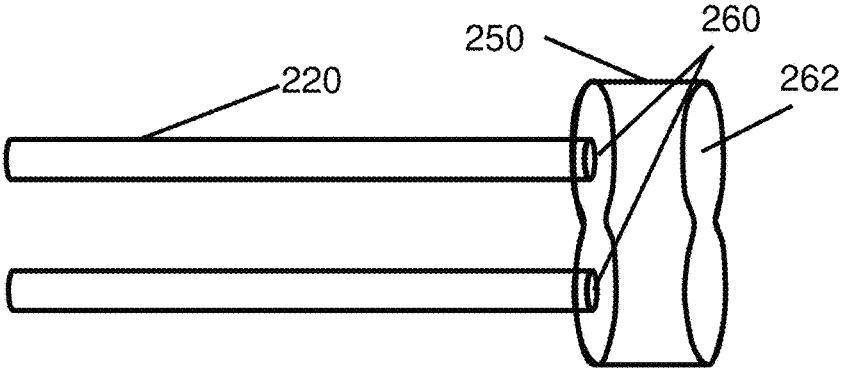
FIG. 3C presents an exemplary endcap that is optically coupled to two optical fibers, according to certain embodiments.

In the above embodiments, each optical fiber is optically coupled to a separate endcap. However, in some embodiments, two or more optical fibers of a plurality of optical fibers may be coupled to a single endcap. In some embodiments, optically coupling two or more optical fibers to an endcap may advantageously simplify alignment of the optical fibers, e.g., by enforcing the relative positions of the two or more optical fibers using the endcap. FIG. 3C presents such an embodiment. In the depicted embodiment, the distal ends 260 of two optical fibers 220 are coupled to endcap 250. While endcap 250 is coupled to two fibers in the illustrated embodiment, in some embodiments, the number of optical fibers coupled to an endcap in such an embodiment may be at 2, at least 5, at least 10, and/or any other appropriate number of optical fibers. In some embodiments, the number of optical fibers coupled to an endcap may be less than or equal to 50, 40, 30, 20, 10, and/or any other appropriate number of optical fibers. Combinations of these ranges are possible. In some embodiments, every optical fiber in an additive manufacturing system is coupled to a single endcap. In other embodiments, multiple groups of optical fibers that are connected to separate endcaps may also be used.

Figure 3D:
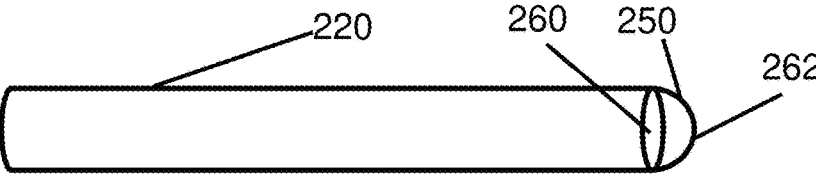
FIG. 3D presents an exemplary mircolens endcap that is optically coupled to an optical fiber, according to certain embodiments.

FIG. 3D illustrates another exemplary endcap of an optical fiber 220, according to certain embodiments. In this embodiment, the endcap 250 is a microlens (e.g., a convex microlens) that is disposed on and optically coupled to the distal end 260 of the optical fiber 220. While in this embodiment the endcap has the same maximum transverse dimension as the distal end 260 of optical fiber to 220, a surface area of distal surface 262 of the endcap 250 is greater than a cross-sectional area of distal end 260 of the optical fiber 220 (e.g. the transmission area of a core of the optical fiber). In this embodiment, the endcap may function as a microlens, which may advantageously focus transmitted laser energy on a desired focal point as it exits the optical fiber. This may reduce the need for subsequent focusing using microlens arrays and other optical components disposed downstream from the optical fibers. Furthermore, a curvature of the distal surface 262 may reduce the back reflection of laser energy in an upstream axial direction towards the associated laser source. This may advantageously reduce the portion of reflected laser energy reaching the laser energy source.

Figure 3E:
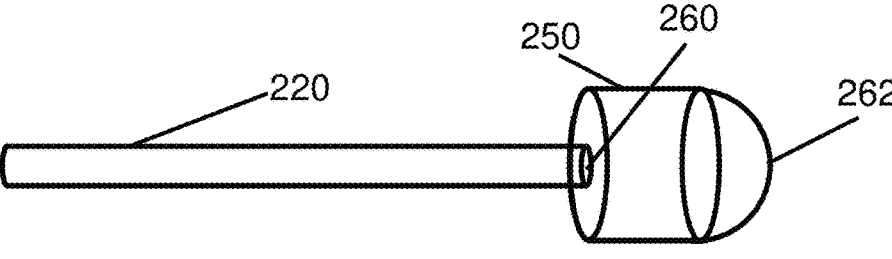
FIG. 3E presents an exemplary endcap that is optically coupled to an optical fiber, according to certain embodiments.
Figure 3F:
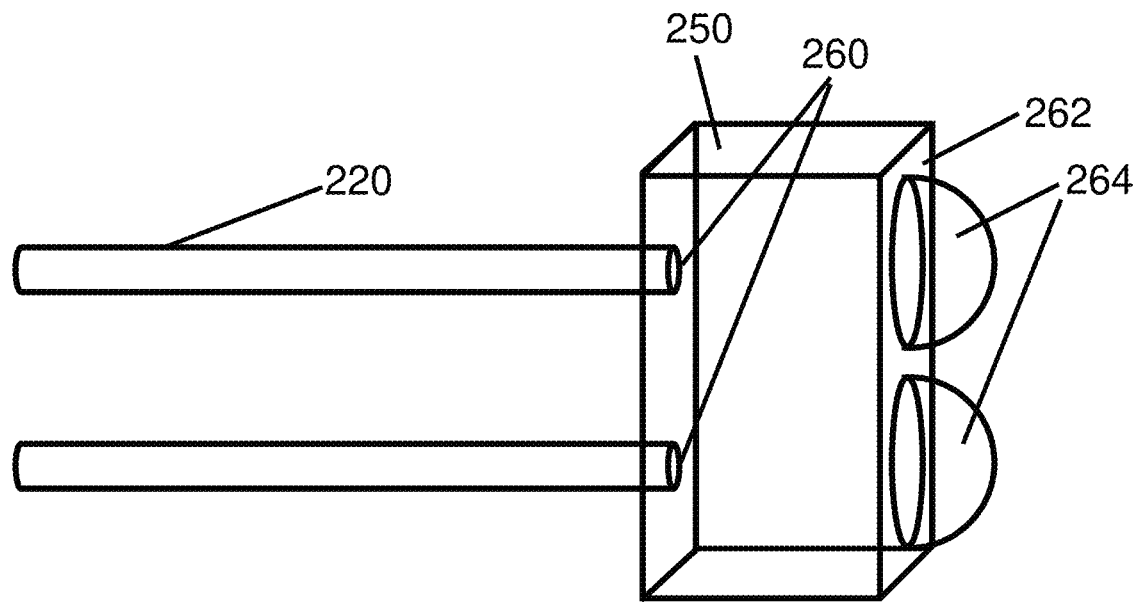
FIG. 3F presents an exemplary endcap that comprises two convex microlens portions and is optically coupled to two optical fibers, according to certain embodiments.

While the microlens endcap shown in FIG. 3D has the same maximum transverse dimension as the optical fiber, other variations of endcaps comprising microlenses are possible. For example, FIG. 3E presents an exemplary endcap 250 that is disposed on and optically coupled to a distal end of the optical fiber 220 where the endcap comprises a proximal cylindrical portion and a distal convex microlens portion. As with the embodiments described in FIGS. 3A-3D, the distal surface 262 of the endcap 250, which is the external surface of the distal convex microlens portion of endcap 250, has a surface area that is greater than a cross-sectional area of the distal end 260 of the optical fiber 220. Similar to the above, such a construction may increase a transmission area of the transmitted laser energy and focus the transmitted laser energy leaving the endcap. FIG. 3F presents an embodiment where the distal ends 260 of two optical fibers 220 are coupled to endcap 250. In FIG. 3F, endcap 250 is similar to endcap 250 of FIG. 3B where a body of the endcap is optically coupled to multiple optical fibers. However, the endcap also includes a distal surface 262 oriented away from the optical fibers that includes two convex microlens portions 264 similar to the convex microlens portion of endcap 250 as shown in FIG. 3E. Thus, in some embodiments, an endcap comprises a plurality of microlens portions where each microlen portion is aligned with a corresponding optical fiber of the plurality of optical fibers. The plurality of microlens portions may act as individual microlenses, in some embodiments. For example, the microlens portions may form an array of microlenses distributed along the distal surface of the endcap oriented away from the optical fibers. As one non-limiting example, endcap 250 of FIG. 3F comprises two convex microlens portions 264. However, in other embodiments, the number of convex microlens portions coupled to an endcap in such an embodiment may be at 2, at least 5, at least 10, at least 20, and/or any other appropriate number of convex microlens portions. In some embodiments, the number of convex microlens portions of an endcap is less than or equal to 50, 40, 30, 20, 10, and/or any other appropriate number of convex microlens portions. Combinations of these ranges are possible including, for example, an end cap with between or equal to 2 and 50 microlens portions formed thereon that are aligned with a corresponding number of optical fibers. As noted above, in some embodiments, each optical fiber in an additive manufacturing system is optically coupled to a single convex microlens portion. For example, optical fiber 220 of FIG. 3E is optically coupled to the convex microlens portion of endcap 250, which is formed by distal end 262 of endcap 250. In some embodiments, every optical fiber in an additive manufacturing system is coupled to a distinct convex microlens portion. For example, referring again to FIG. 3F, each optical fiber 220 is optically coupled to a distinct convex microlens portion.

While FIGS. 3A-3F are representative of possible endcap constructions, it should be understood that they are non-limiting, and that any suitable endcap geometry may be used. Additionally, embodiments in which combinations of different types of endcaps are used within a single system are also contemplated.

That said, in some embodiments, each endcap of the one or more endcaps is selected from the group of a block, a cylinder, a prism, and a microlens that is disposed on and optically coupled to a distal end of one or more associated optical fibers.

Figure 4A:
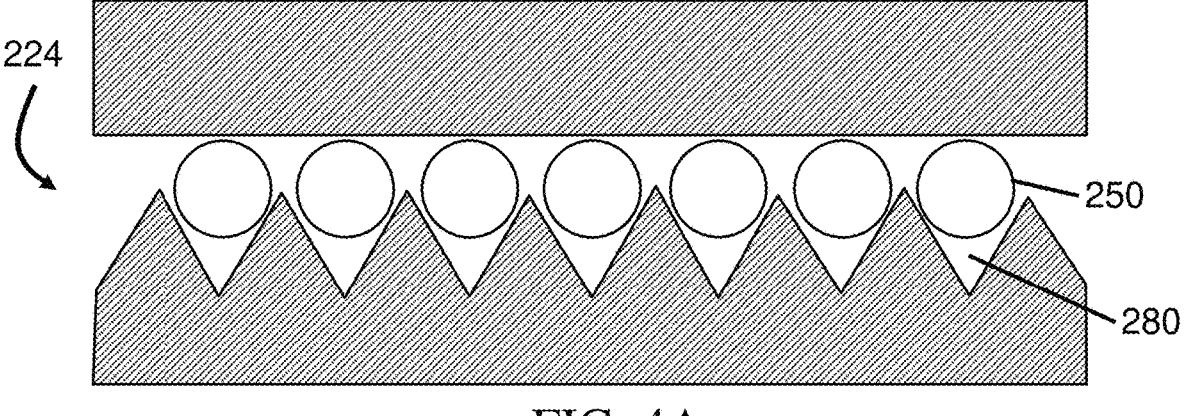
FIG. 4A presents an exemplary alignment fixture and exemplary endcaps in a linear array, according to certain embodiments.
Figure 4B:
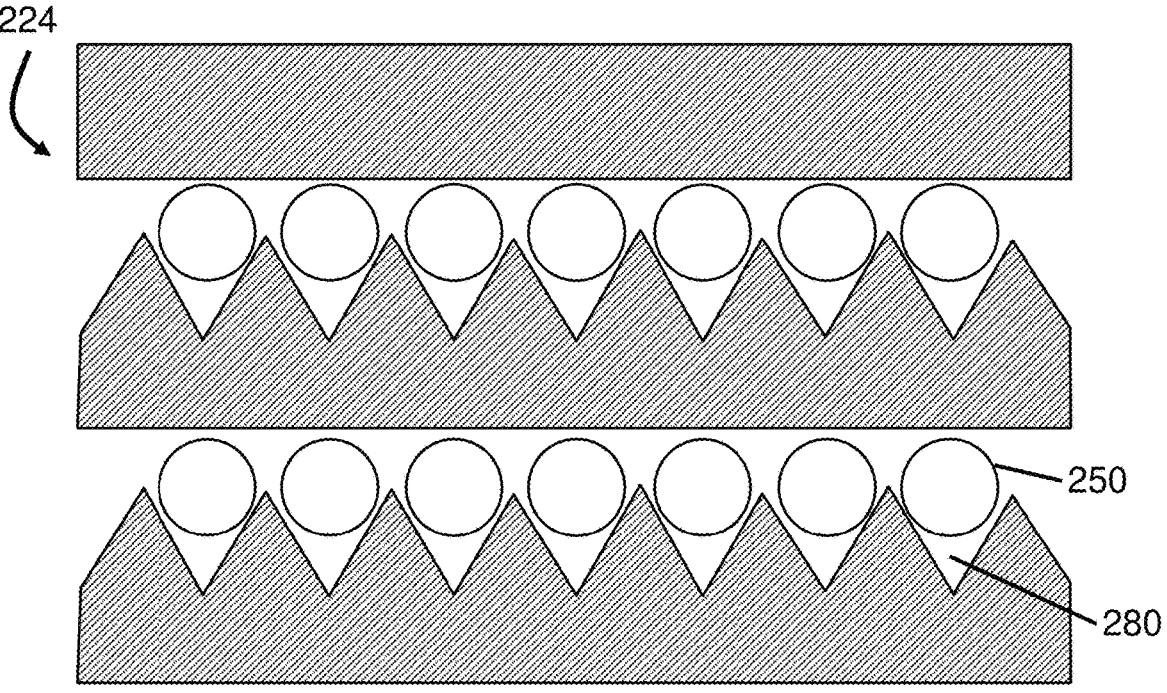
FIG. 4B presents an exemplary alignment fixture and exemplary endcaps in a two-dimensional array, according to certain embodiments.

FIGS. 4A-4B present front views of exemplary alignment fixtures 224 and endcaps 250 according to certain embodiments. In the embodiment depicted in FIG. 4A, the alignment fixture includes a plurality of v-grooves formed in a first portion of the fixture. Each of the v-grooves include two opposing angled surfaces that are slanted inwards such that an optical fiber and/or endcap 250 positioned in a given v-groove is disposed against the inwardly angled surfaces of the associated v-groove. The v-grooves may be parallel to one another such that the v-grooves extend in an axial direction oriented into a plane of the figure. This may help to align the optical fibers and endcaps with a desired transmission direction. Additionally, by appropriately controlling the width and depth of the V grooves as well as the corresponding transverse dimensions of the optical fiber and/or endcap the optical fibers and/or endcaps may be easily positioned in both a horizontal and vertical direction which may be perpendicular to the axial length of the optical fibers which extend into the plane of the depicted figure.

In the depicted embodiment, the optical fibers and/or endcaps 250 may be retained in the associated v-grooves 280 by a second portion of the alignment fixture 224 that is disposed against a surface of the optical fibers and/or endcaps that is opposite from the first portion of the alignment fixture the v-grooves are formed in. The first and second portions of the alignment fixture may be coupled to one another in any appropriate fashion including, but not limited to, adhesives, fasteners, mechanically interlocking features, welds, and/or any other appropriate type of connection. In the depicted embodiment, the v-grooves are formed in a single portion of the alignment fixture and are uniformly spaced from one another such that the endcaps positioned in the v-grooves are positioned in a linear array. However, as shown in FIG. 4B, the alignment fixture may include v-grooves formed in multiple portions of the alignment fixture. For example, a first set of optical fibers and/or endcaps may be positioned in a first set of v-grooves formed in a first portion of the alignment fixture. The first set of optical fibers and/or endcaps may be retained in the first set of v-grooves by a second portion of the alignment fixture disposed thereon with the first set of optical fibers and/or endcaps disposed therebetween. A second set of v-grooves may be formed in the second portion of the alignment fixture opposite from the first portion of the alignment fixture for receiving a second set of optical fibers and/or endcaps disposed therein. This layered arrangement may be continued for any number of layers to provide a desired number of rows in a two-dimensional array. However, in the depicted embodiment, a third portion of the alignment fixture is disposed on the second portion of the alignment fixture with the second set of optical fibers and/or endcaps disposed there between.

In the above embodiments, the endcaps may be aligned in any suitable orientation and/or position within an alignment fixture. For example, the endcaps of the linear array of FIG. 4A may be regularly spaced or irregularly spaced depending on the desired application. Similarly, the two-dimensional array of FIG. 4B may include multiple regularly and/or irregularly spaced optical fibers and/or endcaps. The two-dimensional array may have any appropriate configuration. For example, the two-dimensional array may be a square array, a rectangular array, a hexagonal array, a monoclinic array, and/or any other appropriate layout.

In certain embodiments, a plurality of optical fibers are optically coupled to one or more endcaps. In certain applications it may be desirable to position the distal most ends of the one or more endcaps within a predetermined range of a desired axial position. This may appropriately position the endcaps relative to other optics located downstream from the endcaps which may provide the desired optical properties and/or control of the laser energy transmitted onto the build surface of an additive manufacturing system. In some such embodiments, a distal end of each of the one or more endcaps may be positioned within 20 microns, within 15 microns, within 12 microns, within 10 microns, within 5 microns, within 2 microns, or any other appropriate distance from a predetermined axial position within the system. In some embodiments, it may also be desirable to maintain uniformity of a length of the one or more endcaps within a predetermined tolerance of a target length. This tolerance for the length of the one or more endcaps may be the same or less than the ranges noted above for the overall tolerancing of an axial position of a distal most surface of the one or more endcaps. Of course, while ranges for the tolerancing associated with the positioning and length of the endcaps are noted above, it should be understood that any appropriate tolerances both greater than and less than those noted above are also contemplated as the disclosure is not limited in this fashion.

FIG. 5 presents an illustration of a portion of an alignment fixture 224 with two endcaps 250 and corresponding optical fibers 220 viewed from above, according to certain embodiments. In this embodiment, the endcaps 250 are disposed in and supported by the v-grooves 280. In some embodiments, the optical fibers may also be disposed in separate corresponding v-grooves that are aligned with the v-grooves associated with the endcaps, not depicted, which may help to support the portions of the optical fibers connected to the endcaps within the alignment fixture. As noted above, it may be desirable to accurately position a distal end of the one or more endcaps relative to a predetermined axial position. In one such embodiment, a distal surface 282 of the endcaps may be disposed against a proximal surface of a one or more transparent structures, such as a block, sheet, or other structure including a flat proximal surface, disposed on a distal portion of the alignment fixture. The proximal surface of the one or more transparent structures may be accurately positioned such that placing the distal ends of the one or more endcaps against this surface may accurately and easily align the distal ends of the endcaps with one another at the predetermined axial position.

In another embodiment, alignment of the distal ends of the one or more endcaps of a system at a predetermined axial position may be provided by the registration of a proximal surface of an endcap (e.g., a surface of the endcap oriented in an upstream direction relative to the direction of transmission of laser energy through the optical fiber) against a supporting structure. For example, FIG. 6 presents an illustration of a portion of an alignment fixture 224 with optical fibers 220 disposed in the depicted v-grooves 280 while the endcaps 250 extend outwards beyond the v-grooves of the alignment fixture 224. The proximal surface 288 of the endcaps may be disposed on a distally oriented surface 286 of a portion of the alignment fixture in which the v-grooves are formed or other appropriate structure. By accurately controlling a position and uniformity of this supporting surface, it may be possible to easily and accurately align the distal surfaces 282 of the endcaps with one another at the predetermined axial position. In such an embodiment, the alignment of the distal-most ends of the one or more endcaps may also depend on the relative uniformity of the length of the individual endcaps.

FIG. 7 presents yet another embodiment of a portion of an alignment fixture 224 with optical fibers 220 and endcaps 250 disposed in corresponding v-grooves 280. Similar to the above, the distal surfaces 282 of the endcaps may be disposed against a proximal surface of a transparent structure 284 to align the distal ends of the endcaps with one another at a predetermined axial position. However, in this embodiment, the endcaps may be received in a correspondingly sized and shaped recesses formed in the transparent structure.

In the above embodiments, specific structures and v-grooves have been illustrated for positioning and orienting optical fibers and endcaps within an alignment fixture. However, it should be understood, that other appropriate types of alignment features may also be used. For example, the endcaps may be received in one or more corresponding holes which may either extend partially or completely through a corresponding portion of an alignment fixture. Other appropriate types of alignment features may include, but are not limited to, v-grooves, holes, optical wedges, and optical blocks. Additionally, the endcaps in these various types of alignment fixtures may be aligned with a desired axial location using any appropriate construction including the constructions shown in the above embodiments as well as other constructions using v-grooves, holes, optical wedges, optical blocks, and/or any other alignment features capable of appropriately positioning the distal ends of the endcaps as the disclosure is not limited in this fashion.

Figures 8, 9:
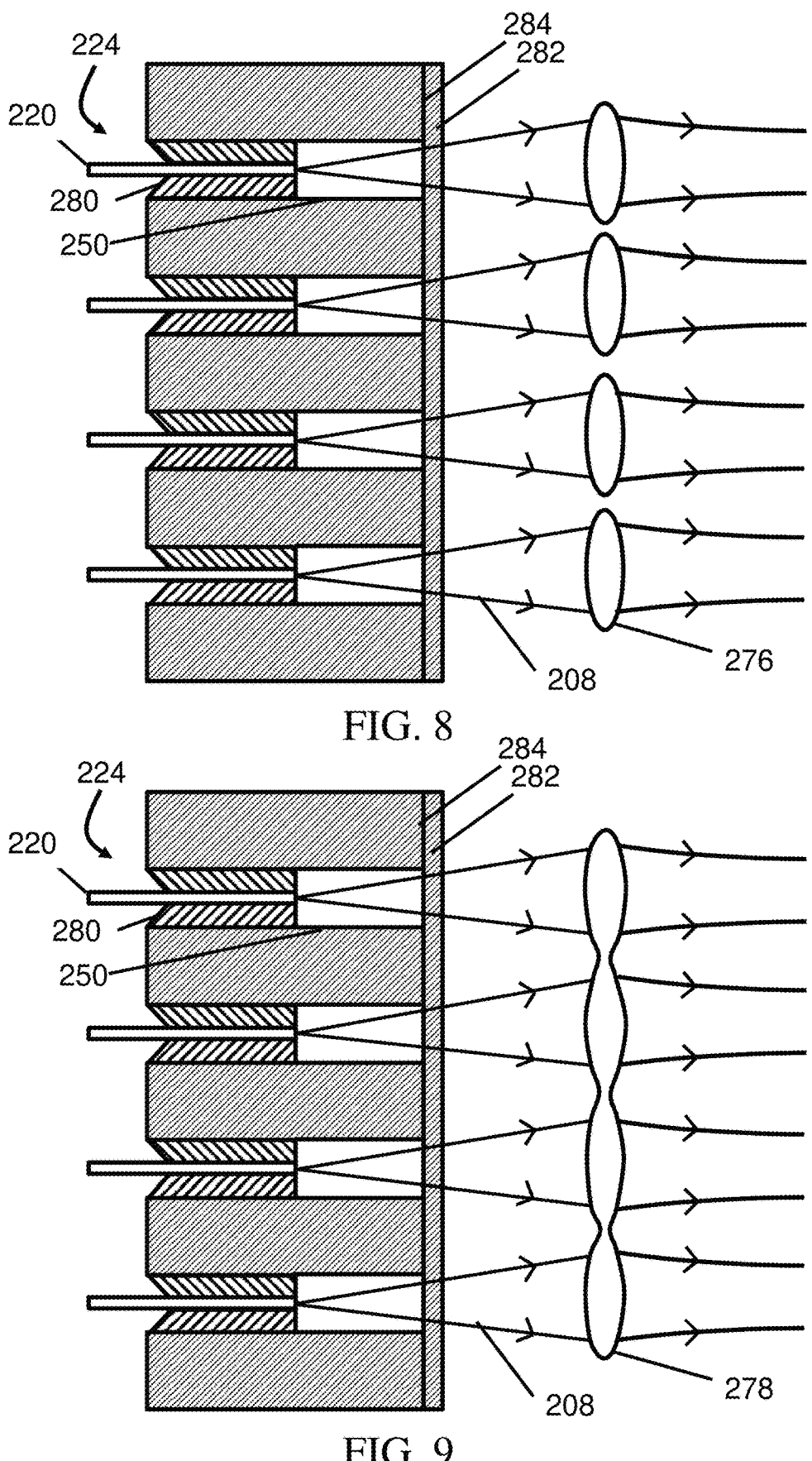
FIG. 8 presents the transmission of laser energy from optical fibers optically coupled with endcaps within an exemplary alignment fixture to a separate microlenses, according to certain embodiments.
FIG. 9 presents the transmission of laser energy from optical fibers optically coupled with endcaps within an exemplary alignment fixture to a microlens array, according to certain embodiments.
Figure 10:
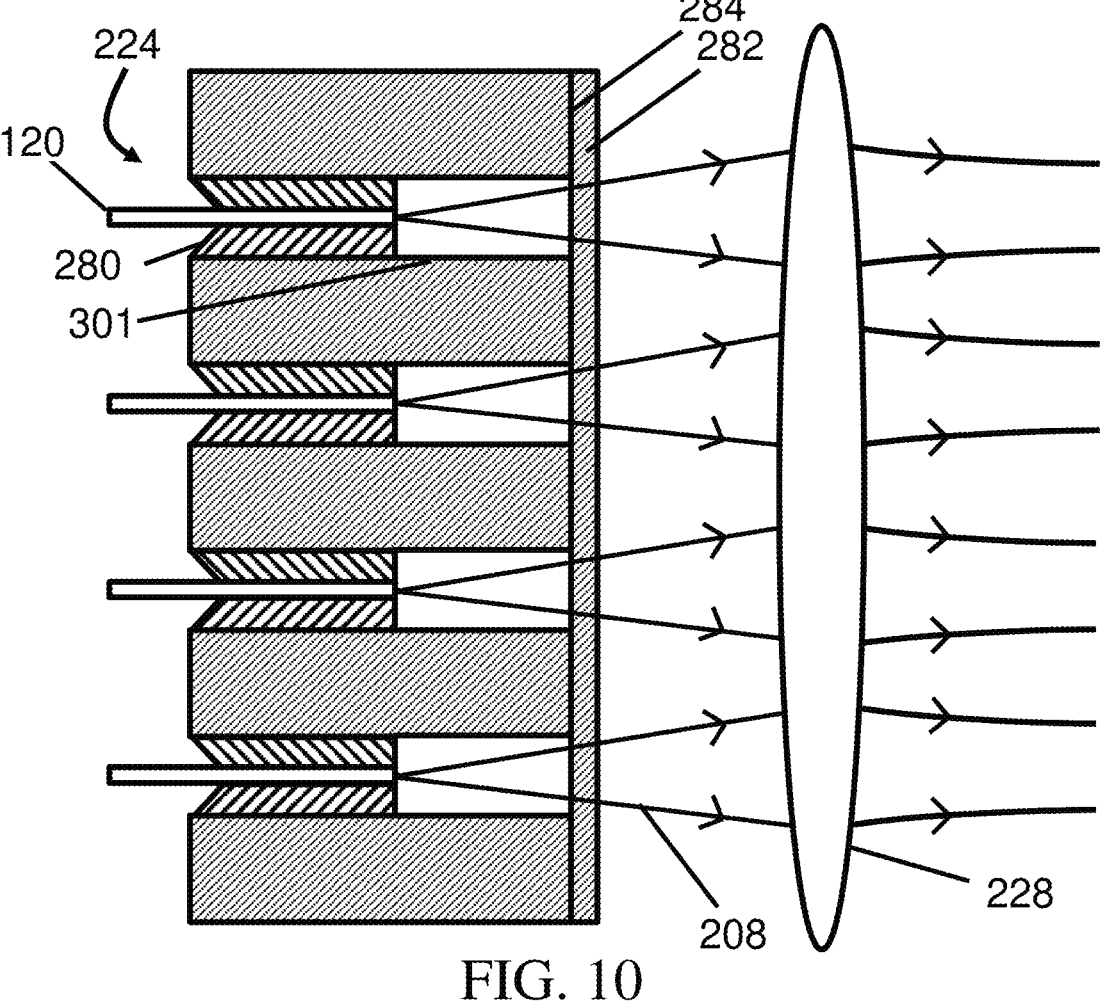
FIG. 10 presents the transmission of laser energy from optical fibers optically coupled with endcaps within an exemplary alignment fixture to a macrolens, according to certain embodiments.

FIG. 8 illustrates the transmission of laser energy from a linear array of endcaps to a linear array of microlenses, according to certain embodiments. As in FIGS. 5-7, FIG. 8 presents an illustration of a portion of an alignment fixture 224, endcap 250, and optical fibers 220, viewed from above, according to certain embodiments. In this embodiment, and similar to FIG. 5, the endcaps 250 rest within v-grooves 280 and are registered against a proximal surface 284 of a transparent structure 282, with the result that the distal-most ends of endcaps 250 are aligned with a desired axial position. However, any appropriate alignment fixture with the one or more optical fibers and endcaps position therein may be used. In this embodiment, laser energy 208 transmitted from endcaps 250 is directed onto a plurality of separate microlenses 276, which are arranged in an array that is aligned with the array of endcaps. FIG. 9 is similar to FIG. 8. However, in this embodiment, the microlenses 276 are provided in the form of a microlens array where the individual microlenses are formed in a single structure. FIG. 10 is similar to FIGS. 8-9. However, in this embodiment, laser energy 208 transmitted from the distal surfaces of the one or more endcaps is directed onto a macrolens 278 which may be used to focus the laser energy transmitted from the one or more endcaps.

In the above embodiments, the transmitted laser energy is depicted as being incident on a microlens or a macrolens. However, it should be understood that any appropriate combination of optics located downstream from the optical fibers and associated endcaps may be used as the disclosure is not so limited. For example, both macrolenses and microlenses may be used in combination with one another and downstream positions relative to the optical fibers and endcaps. Thus, the depicted embodiments should not be viewed as limiting the use of the disclosed optical fibers and endcaps to any particular system configuration.

The following examples are intended to illustrate certain embodiments of the present disclosure, but do not exemplify the full scope of the disclosure.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03

The invention claimed is:

1. An additive manufacturing system comprising:
a laser energy source;
an optics assembly configured to direct laser energy from the laser energy source onto a build surface to form a laser energy spot on the build surface;
an optical fiber optically coupled with the laser energy source; and
an endcap disposed on and optically coupled with a distal end of the optical fiber, wherein a surface area of a distal surface of the endcap is larger than a transverse cross sectional area of the distal end of the optical fiber, wherein the endcap is optically coupled with the optics assembly, wherein the endcap comprises at least one microlens portion configured to focus the laser energy from the laser energy source onto the build surface to fuse material on the build surface and wherein the endcap is configured to reduce a first power area density of the laser energy transferred from the distal end of the optical fiber by a factor greater than or equal to 10 within the endcap relative to a second power area density within the optical fiber.

2. The additive manufacturing system of claim 1, wherein the endcap is configured to increase a transmission area of laser energy transmitted from the laser energy source to reduce a power area density of the transmitted laser energy.

3. The additive manufacturing system of claim 1, wherein the distal end of the optical fiber is fused with the endcap.

4. The additive manufacturing system of claim 1, further comprising one or more lenses disposed downstream from and optically coupled to the endcap.

5. The additive manufacturing system of claim 1, wherein the endcap is selected from a group of a cylinder, a prism, and a microlens.

6. The additive manufacturing system of claim 1, wherein the at least one microlens portion comprises multiple microlens portions.

7. The additive manufacturing system of claim 1, wherein an axial position of the distal end of the endcap is within 20 microns of a predetermined axial position.

8. The additive manufacturing system of claim 1, wherein the distal surface of the endcap is a curved distal surface configured to decrease a portion of the laser energy that is reflected back toward the laser energy source.

9. The additive manufacturing system of claim 8, wherein the curved distal surface is at least partially coated with an anti-reflective coating to decrease the portion of the laser energy that is reflected back toward the laser energy source.

10. The additive manufacturing system of claim 1, wherein the endcap is configured to cause the laser energy to diverge within the endcap to increase a transmission area of the laser energy transmitted from the laser energy source.

11. The additive manufacturing system of claim 10, further comprising one or more lenses disposed downstream from and optically coupled to the endcap to focus the laser energy transmitted from the endcap.

12. The additive manufacturing system of claim 1, wherein the at least one microlens portion is a microlens, the endcap comprising the at least one microlens comprises the microlens being the endcap, and the transverse cross sectional area of the distal end of the optical fiber is the same as the transverse cross sectional area of the microlens.

13. The additive manufacturing system of claim 1, wherein the endcap comprises a cylindrical portion and the at least one microlens portion, the cylindrical portion is coupled to the distal end of the optical fiber, and the at least one microlens portion is coupled to the distal end of the cylindrical portion.

14. The additive manufacturing system of claim 1, wherein the factor is greater than or equal to 10 and less than or equal to 50.

15. The additive manufacturing system of claim 1, wherein the endcap is configured to increase a first transmission area of the laser energy transferred from the distal end of the optical fiber by a factor greater than or equal to 10 within the endcap relative to a second transmission area within the optical fiber.

16. The additive manufacturing system of claim 15, wherein the factor is greater than or equal to 10 and less than or equal to 50.

17. An additive manufacturing system comprising:

a laser energy source;

an optics assembly configured to direct laser energy from the laser energy source onto a build surface to form a laser energy spot on the build surface;

an optical fiber optically coupled with the laser energy source; and an endcap disposed on and optically coupled with a distal end of the optical fiber, wherein the endcap is configured to increase a transmission area of laser energy transmitted from the laser energy source to reduce a first power area density of the transmitted laser energy by a factor greater than or equal to 10 within the endcap relative to a second power area density within the optical fiber, and wherein the endcap comprises at least one microlens portion configured to focus the laser energy from the laser energy source onto the build surface to fuse material on the build surface.

18. The additive manufacturing system of claim 17, wherein a surface area of a distal surface of the endcap is larger than a transverse cross-sectional area of the distal end of the optical fiber.

19. An additive manufacturing system comprising:

a plurality of laser energy sources;

an optics assembly configured to direct laser energy from the plurality of laser energy sources onto a build surface to form an array of laser energy spots on the build surface;

a plurality of optical fibers optically coupled with the plurality of laser energy sources; and one or more endcaps disposed on and optically coupled with a distal end of each optical fiber, wherein each endcap of the one or more endcaps has a surface area of a distal surface that is larger than a transverse cross-sectional area of the distal ends of the optical fibers disposed thereon, wherein each endcap of the one or more endcaps comprises at least one microlens portion configured to focus the laser energy exiting from the distal ends of the optical fibers disposed thereon onto the build surface to fuse material on the build surface, wherein the plurality of optical fibers forms an array, and wherein the one or more endcaps are configured to reduce a first power area density of the laser energy transferred from the distal end of each optical fiber by a factor greater than or equal to 10 within the one or more endcaps relative to a second power area density within each optical fiber.

20. The additive manufacturing system of claim 19, wherein the one or more endcaps are configured to increase a transmission area of laser energy transmitted from the plurality of laser energy sources to reduce a power area density of the transmitted laser energy.

21. The additive manufacturing system of claim 19, wherein the distal end of each optical fiber is fused with the one or more endcaps.

22. The additive manufacturing system of claim 19, further comprising one or more lenses disposed downstream from and optically coupled to the one or more endcaps.

23. The additive manufacturing system of claim 19, further comprising an alignment fixture configured to position and orient the one or more endcaps.

24. The additive manufacturing system of claim 23, wherein the alignment fixture comprises v-grooves.

25. The additive manufacturing system of claim 19, wherein the array is a linear array.

26. The additive manufacturing system of claim 19, wherein the array is a two-dimensional array.

27. The additive manufacturing system of claim 19, wherein two or more optical fibers of the plurality of optical fibers are optically coupled to a single endcap of the one or more endcaps.

28. The additive manufacturing system of claim 19, wherein each optical fiber of the plurality of optical fibers is optically coupled to a separate endcap of the one or more endcaps.

29. The additive manufacturing system of claim 19, wherein each endcap of the one or more endcaps is selected from a group of a cylinder, prism, and a microlens.

30. The additive manufacturing system of claim 19, wherein an axial position of a distal end of each endcap of the one or more endcaps is within 20 microns of a predetermined axial position.

31. The additive manufacturing system of claim 19, wherein the at least one microlens portion of each endcap comprises multiple microlens portions.

* * * * *